UNITED STATES PATENT OFFICE.

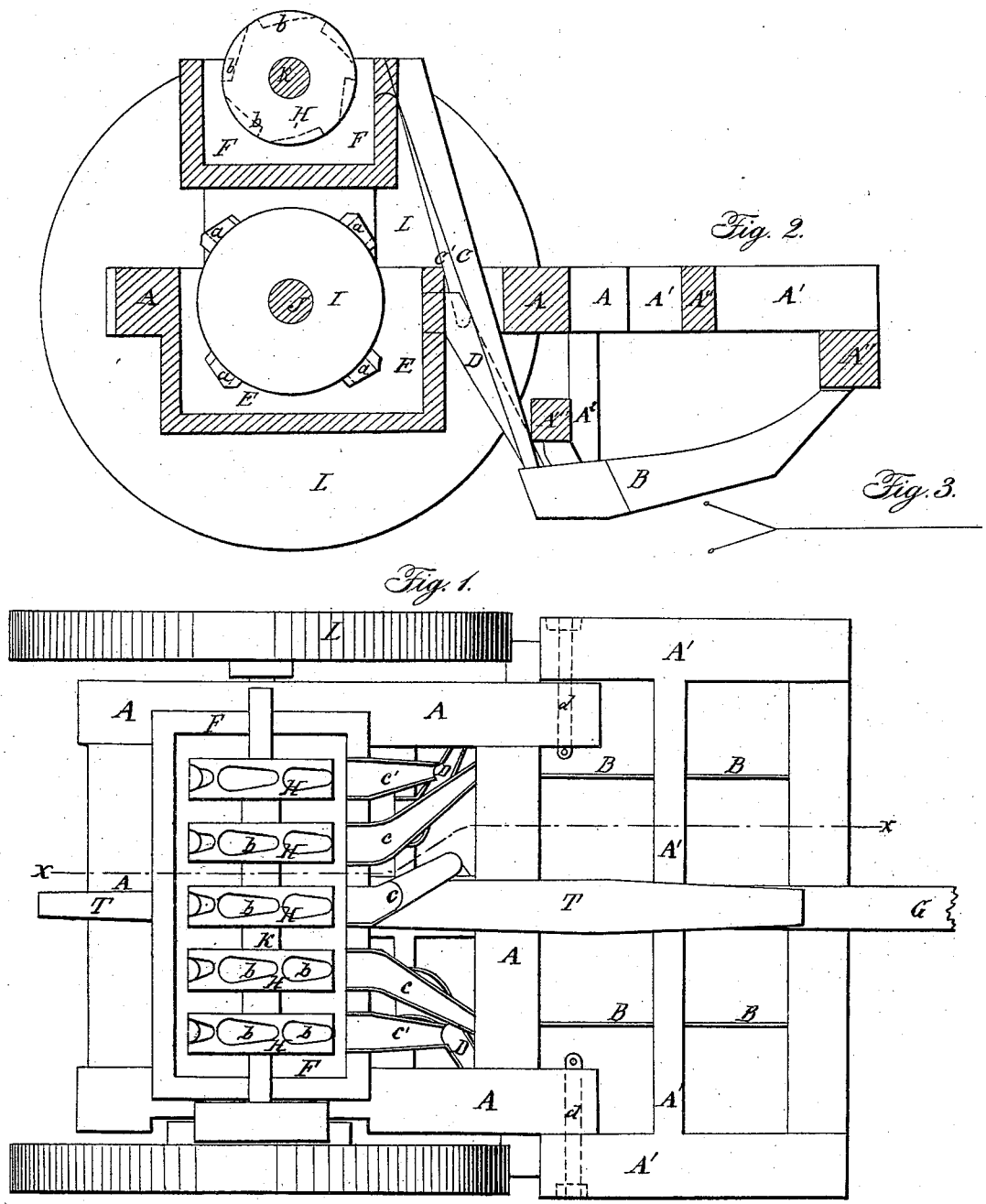

ELIJAH YOUNG, OF FAYETTEVILLE, MISSOURI.

IMPROVEMENT IN SEED-PLANTERS.

Specification forming part of Letters Patent No. 28,936, dated June 26, 1860.

*To all whom it may concern:*

Be it known that I, ELIJAH YOUNG, of Fayetteville, in Johnson county, State of Missouri, have invented a new and Improved Combined Wheat and Corn Planter; and I do hereby declare that the following is a full, clear, and exact description of the same, reference being had to the annexed drawings, making part of this specification, in which—

Figure 1 is a top view; Fig. 2, a section through $x$, and Fig. 3 a part of the machine to be hereinafter explained.

To enable others skilled in the arts to which my invention appertains to make and use the same, I will proceed to describe the construction and operation thereof.

The frame of my machine is represented upon the drawings by A A', the part A' being joined to the part A by means of the pin $d$, so as to form a working-joint. In the frame A the box E is fixed, and across the top of it, in suitable bearings, the shaft J is placed, and on it one or more wheels, I, are placed, in the periphery of which a number of small tubes, $a\ a\ a\ a$, are fixed. From the box E there are one or more tubes, D, leading to the heels of the plows B. These plows B are fixed to the frame A' at A'' A''', the heel or rear ends of the said plows being secured by means of an upright frame-piece, $A^2$, to the rear end of the frame A'. Over the top of the box E the box F is arranged and secured in some permanent manner, and across the top of the said box, in suitable journal-boxes, the shaft K is placed, upon which a series of wheels, H, are fixed, with small cavities cut in their peripheries, as shown in dotted lines by $b\ b$; and from the top of this said box there are a series of tubes leading, as shown at C' C, either directly to the rear ends of the plows B or to the tubes D, and from thence to the rear ends of the said plows.

When this machine is used for planting corn, the corn is put in the box E, from whence it is taken by the tubes $a$, one kernel at a time, and deposited in the tube D, through which it falls to the ground in the rear ends of the plows, which are made as shown in Fig. 3.

When the machine is used to plant wheat the grain is put in the box F, from whence it is taken by the cavities in the peripheries of the wheels H and deposited in the tubes C C', through which it falls to the ground.

I claim—

The use of the plows B, in combination with tubes D and C C', and the boxes E F, and the wheels I and H, for the purpose specified.

ELIJAH YOUNG.

Witnesses:
AMOS BROADNAX,
C. E. GRAY.